United States Patent
Oda

(10) Patent No.: US 8,134,617 B2
(45) Date of Patent: Mar. 13, 2012

(54) IMAGING APPARATUS

(75) Inventor: Kazuya Oda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 350 days.

(21) Appl. No.: 12/564,795

(22) Filed: Sep. 22, 2009

(65) Prior Publication Data

US 2010/0079628 A1    Apr. 1, 2010

(30) Foreign Application Priority Data

Sep. 26, 2008    (JP) .................. 2008-247201

(51) Int. Cl.
- *H04N 9/64* (2006.01)
- *H04N 5/235* (2006.01)
- *H04N 9/083* (2006.01)
- *H04N 3/14* (2006.01)
- *H04N 5/335* (2011.01)
- *H04N 9/04* (2006.01)

(52) U.S. Cl. ............ 348/247; 348/229.1; 348/280

(58) Field of Classification Search .......... 348/230.1, 348/245, 246, 247
See application file for complete search history.

(56) References Cited

U.S. PATENT DOCUMENTS

| | | | |
|---|---|---|---|
| 6,141,049 A | 10/2000 | Harada | |
| 7,098,950 B2 | 8/2006 | Yamamoto et al. | |
| 7,223,955 B2 | 5/2007 | Suzuki | |
| 7,440,019 B2 * | 10/2008 | Suzuki et al. | 348/315 |
| 7,518,644 B2 * | 4/2009 | Kobayashi et al. | 348/246 |
| 2005/0062862 A1 * | 3/2005 | Matsuyama et al. | 348/246 |
| 2006/0006426 A1 * | 1/2006 | Inaba | 257/223 |
| 2006/0209198 A1 * | 9/2006 | Kitaoka et al. | 348/241 |
| 2008/0180554 A1 * | 7/2008 | Kobayashi et al. | 348/246 |
| 2008/0273101 A1 * | 11/2008 | Takenaka et al. | 348/243 |

FOREIGN PATENT DOCUMENTS

| | | |
|---|---|---|
| JP | 9-191099 | 7/1997 |
| JP | 2001-285572 | 10/2001 |
| JP | 2004-350104 | 12/2004 |
| JP | 2005-72966 | 3/2005 |

* cited by examiner

*Primary Examiner* — Albert Cutler
(74) *Attorney, Agent, or Firm* — McGinn IP Law Group, PLLC

(57) ABSTRACT

A CCD image sensor has an imaging surface composed of an effective pixel area and OB areas, and first and second light receiving element groups on even-numbered and odd-numbered columns respectively in the imaging surface. These light receiving element groups have separately-controllable exposure times, and they are set to low and high sensitivities. An imaging device includes this CCD, a memory storing defective pixel information of the OB areas, an OB clamping circuit for applying an OB clamp processing to the light receiving element groups, and an image processing circuit for generating image data from the output signals of the light receiving element groups after the OB clamp processing. Referring the defective pixel information, a CPU sets one of the light receiving element groups having more OB defective pixels to low sensitivity, and the other having less OB defective pixels to high sensitivity.

7 Claims, 6 Drawing Sheets

IMAGE AFTER OB CLAMP
BLACKENED REGION

BLACK REFERENCE LEVEL
VERTICAL TRANSFER DIRECTION

LINE FLAW

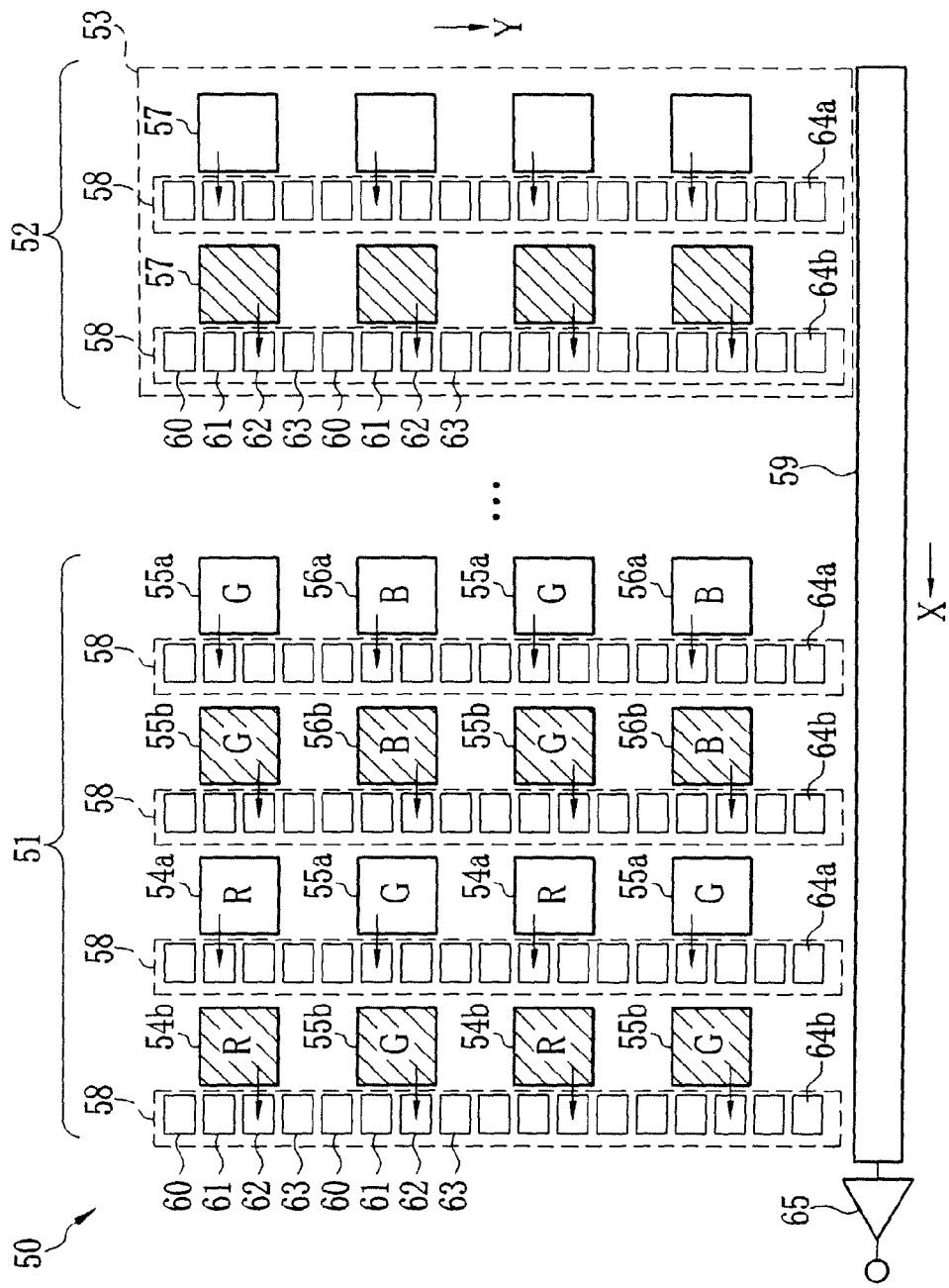

IMAGING APPARATUS

FIELD OF THE INVENTION

The present invention relates to an imaging apparatus configured to correct output signals from an effective pixel area of a solid-state imaging device using output signals from optical black areas.

BACKGROUND OF THE INVENTION

A typical solid-state imaging device, such as a CCD image sensor, has an effective pixel area for receiving object light, and at least one optical black area (hereinafter, OB area) shielded from the object light. The OB area is provided for calculating a reference value (hereinafter, black reference level) to be used for correcting output signals from the effective pixel area. Calculation of this black reference level calculation and subsequent signal correcting process are generally performed in a so-called OB clamping circuit.

During a blanking period, the OB clamping circuit determines the black reference level by averaging the output signals (dark-current signals) generated from the OB area. Then, during a signal-output period of the effective pixel area, the OB clamping circuit subtracts the black reference level from the output signal of each light receiving element. This OB clamp processing is generally classified into two types: a line clamp processing performed upon the scanning of one horizontal line (row), and a frame clamp processing performed upon the scanning of one frame.

If the OB area contains one or more defective pixels (hereinafter, OB defective pixels), the black reference level becomes higher than it should be. As a result, the output signals from the effective pixel area are redundantly reduced in the OB clamp processing, and the resultant image is blackened (brightness of an image is lowered). In the line clamp processing, the OB defective pixel may have a significant impact since there are a few pixels on each horizontal line in the OB area. The horizontal line having the OB defective pixel is thus excessively blackened, and results in appearing as a black streak in the image.

Additionally, the CCD image sensors may have a deficiency called a line flaw which is a product of vertically extending defective pixels due to a deficiency of the vertical transfer path. In the event that such a line flaw occurs in the OB area, the brightness may change in all the horizontal lines crossing the line flaw.

To prevent the degradation of image due to the OB defective pixels, Japanese Patent Laid-open Publication No. 2004-350104 discloses an image processor which performs a median filter process before the OB clamp processing so as to correct the OB defective pixels. In addition, U.S. Pat. No. 7,098,950 B2 discloses a MOS type image sensor that stabilizes the output signals by connecting the reset terminals of all the light receiving elements on the same horizontal line across the effective pixel area and the OB area to a common potential-averaging line.

However, the image processor of the Publication No. 2004-350104 requires a separate filtering circuit for correcting the OB defective pixels, resulting in a cost rise. The image sensor of the U.S. Pat. No. 7,098,950 B2 needs to rearrange the pixel array to install the potential-averaging line. This special pixel array can only be achieved in the MOS type image sensors.

SUMMARY OF THE INVENTION

In view of the foregoing, it is an object of the present invention to provide an imaging apparatus for suppressing degradation of image due to OB defective pixels without specific configuration.

In order to achieve the above and other objects, the imaging apparatus according to the present invention includes a solid-state imaging device, a memory, a drive controller for the solid-state imaging device, a clamping device and an image processor. The solid-state imaging device has a plurality of light receiving elements arranged into a two dimensional array on an imaging surface composed of an effective pixel area and optical black areas. These light receiving elements belong to one of first and second element groups whose exposure times can be controlled separately. Each of the first and second element groups can be set to high or low sensitivity. The memory stores defective pixel information of the optical black areas. The drive controller refers to the defective pixel information, and sets one of the first and second element groups having more defective pixels in the optical black areas to low sensitivity while setting the other element group having less defective pixels in the optical black areas to high sensitivity. The clamping device acquires an average value of output signals from the optical black areas, and corrects each output signal from the effective pixel area using the average value. The clamping device performs these average value acquisition and output signal correction to each of the first and second element groups. The image processor generates image data after combining the corrected output signals of the first and second element groups in each pixel.

In the preferred embodiment of the present invention, the light receiving elements are arranged along row and column directions of the imaging surface. The light receiving elements of the first and second element groups are alternated in the row direction. The clamping device performs the average value acquisition and the output signal correction row-by-row to each of the first and second element groups.

Additionally, above the effective pixel area is provided a set of red, blue and green color filters. These color filters constitute a Bayer array for each of the first and second element groups.

The light receiving elements are preferably arranged in a honeycomb pattern, or in a square lattice pattern. The solid-state imaging device is preferably a CCD image sensor.

The defective pixel information in the preferred embodiment is positional information of defective pixels in the optical black areas. The drive controller identifies the defective pixels based on this positional information, and finds the number of the defective pixels in the optical black areas for each of the first and second element groups.

According to the present invention, the light receiving element group having more OB defective pixels is set to low sensitivity, and the impact of the OB defective pixels on the OB clamp processing is reduced accordingly. It is therefore possible to suppress degradation of image due to the OB defective pixels without specific configuration.

BRIEF DESCRIPTION OF THE DRAWINGS

The above objects and advantages of the present invention will become more apparent from the following detailed description when read in connection with the accompanying drawings, in which:

FIG. 3A and FIG. 3B are explanatory views showing operation of the CCD image sensor;

FIG. 6 is a schematic plan view of a CCD image sensor according to a second embodiment of the present invention.

DETAILED DESCRIPTION OF THE PREFERRED EMBODIMENTS

Figure 1:
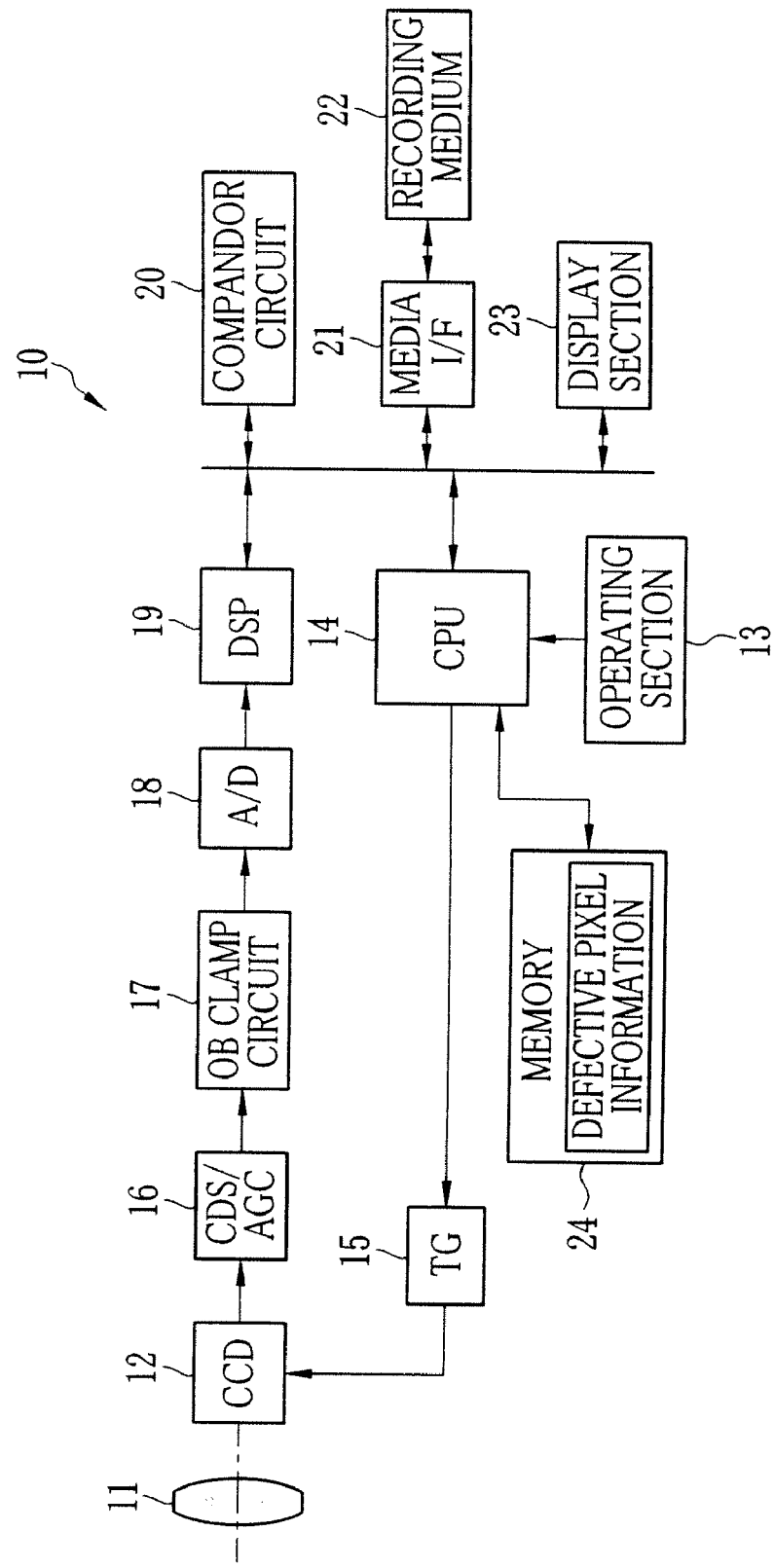
FIG. 1 is block diagram of a digital camera according to a first embodiment of the present invention.

Referring to FIG. 1, a digital camera 10 has a taking lens 11, and a CCD image sensor (hereinafter, CCD) 12 at a focal point of the taking lens 11. The CCD 12 is driven by a timing generator (TG) 15 that is controlled by a CPU 14 responding to the operation on an operating section 13.

A CDS/AGC circuit 16 performs correlation double sampling (CDS) to suppress noise in pixel signals that the CCD 12 generated, and then performs automatic gain correction (AGC) to normalize the amplitude of each pixel signal.

Receiving the output signals from the CDS/AGC circuit 16, an OB clamping circuit 17 applies OB clamp processing (line clamp processing) to each row of light receiving elements. More specifically, the OB clamping circuit 17 firstly averages the signals (dark current signals) of two pixels on one row (either odd-numbered or even-numbered row) in an OB area 31 (see, FIG. 2). Then, the OB clamping circuit 17 subtracts this averaged value, or a black reference level from a signal (effective pixel signal) of each pixel of the same row in an effective pixel area 30 (see, FIG. 2).

An A/D converter 18 converts the effective pixel signals after the OB clamp processing into digital equivalents, and enters them into a digital signal processor (DSP) 19.

The DSP 19 puts these digital signals from the A/D converter 18 into an adding operation where two adjoining color-identical pixels are combined between adjacent odd-numbered and even-numbered rows. The DSP 19 then performs various types of signal processing, including defective pixel correction processing, synchronization processing, gamma correction processing, white balance correction processing and Y/C conversion processing, to produce image data. The pixel signals of high and low sensitivity light receiving elements are combined in the adding operation, and the dynamic range is thereby expanded. The dynamic range expansion technique using such pixel signal adding operation is common in the art, as in U.S. Pat. Nos. 6,141,049 and 7,223,955 (corresponding to Japanese Patent Laid-open Publications No. 09-191099 and No. 2005-72966).

A compandor circuit 20 compresses the Y/C data that DSP 19 produced. Additionally, this compandor circuit 20 expands the compressed image data that is retrieved from a recording medium 22 through a media interface 21. A display section 23 includes a liquid crystal display to display an image corresponding to the Y/C data from the DSP 19. The display section 23 also displays an image corresponding to the image data retrieved from the recording medium 22.

A memory 24 is a flash memory or the like for storing defective pixel information of the CCD 12. This defective pixel information indicates the positions of defective pixels in the effective pixel area 30 and the OB areas 31. The defective pixel information is produced through a quality inspection in the factory, and stored in the memory 24. The defective pixel information may relate only to either odd-numbered or even-numbered columns having more defective pixels. It is not necessary, in this case, to judge as to which of the odd-numbered and even-numbered columns have more defective pixels.

Figure 2:
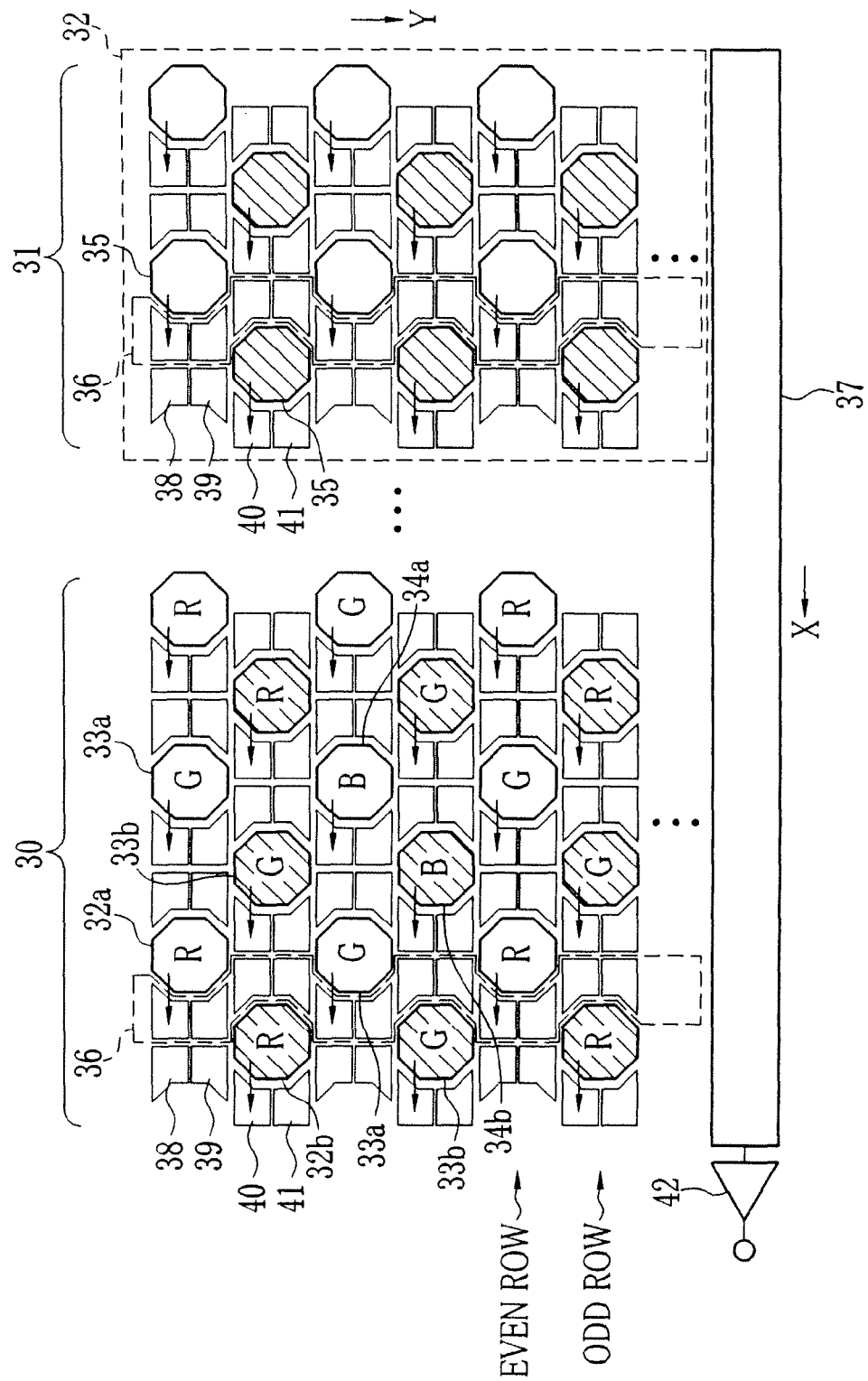
FIG. 2 is a schematic plan view of a CCD image sensor.

As shown in FIG. 2, the COD 12 has an imaging surface composed of the effective pixel area 30 and two OB areas 31. The effective pixel area 30 is an area for generating image signals through photoelectric conversion of object light. The OB areas 31 are located on both sides of the effective pixel area 30, and covered with aluminum light-shielding films 32 to shield the OB areas 31 from the object light. For the sake of clarity, only one OB area 31 is shown in the drawing.

In the effective pixel area 30, a plurality of light receiving elements 32a to 34a, 32b to 34b (some of which are denoted by reference numerals) of same size are arranged in a column direction (Y direction) and a row direction (X direction). Above the effective pixel area 30 is formed a plurality of red, green and blue color filters R, G, B to capture color information. The light receiving elements 32a, 33a, 34a are placed on every even-numbered column from the downstream side of the row direction. The light receiving elements 32a capture red light, the light receiving elements 33a capture green light, and the light receiving elements 34a capture blue light. By contrast, the light receiving elements 32b, 33b, 34b (the hatched elements) are placed on every odd-numbered column. The light receiving elements 32b capture red light, the light receiving elements 33b capture green light, and the light receiving elements 34b capture blue light.

Focusing only on the even-numbered columns, first columns having the alternately-arranged light receiving elements 32a, 33a and second columns having the alternately-arranged light receiving elements 32a, 34a are arranged in turns in the row direction. The color filters on the even-numbered columns constitute a so-called Bayer filter mosaic as whole. Similarly, focusing only on the odd-numbered columns, the first columns having the alternately-arranged light receiving elements 32b, 33b and second columns having the alternately-arranged light receiving elements 32b, 34b are arranged in turns in the row direction. The color filters on the odd-numbered columns also constitute the Bayer filter mosaic as whole. In other words, the effective pixel area 30 uses a combination of two Bayer color filter mosaics, or so-called double Bayer arrangement. A thing to note is that the light receiving elements on the odd-numbered columns are shifted by half array pitch from the elements on the even-numbered columns in the Y direction, and the light receiving elements are as whole arranged in a honeycomb pattern.

Light receiving elements 35 in the OB area 31 are shielded from light by the aluminum light-shielding film 32, and there is no color difference among them. The light receiving elements 35 are of the same size and arrangement as the light receiving elements in the effective pixel area 30.

Each of the light receiving elements in the effective pixel area 30 receives incident light, and converts it into a signal charge proportional to the luminous intensity. As shown by arrows, these signal charges are firstly read out through transfer gates of the light receiving elements to vertical transfer paths 36 (some of which are denoted) extending in the column direction, and then transferred in the column direction to a horizontal transfer path 37. Each of the vertical transfer paths 36 includes a plurality of vertical transfer channels (not shown) extending in the column direction in the semiconductor substrate, and a plurality of vertical transfer electrodes 38 to 41 (some of which are denoted) formed on the vertical transfer channels. Electrically interconnected in the row direction, the vertical transfer electrodes 38 to 41 hold the signal charges read out from the light receiving elements. Upon application of four-phase vertical transfer pulse to the vertical transfer electrodes 38 to 41 from the TG 15, the signal charges are advanced in the column direction on the vertical transfer channels.

Reading of the signal charges from the light receiving elements in the effective pixel area 30 to the vertical transfer paths 36 is controlled by two different read-out pulses: the one superimposed on a phase-one vertical transfer pulse to be applied to the vertical transfer electrode 38 and the other on a phase-two vertical transfer pulse to be applied to the vertical transfer electrode 40. In the effective pixel area 30, more specifically, the signal charges of the even-numbered columns' light receiving element group are read out to the vertical transfer electrodes 38 in response to the read-out pulse on the phase-one vertical transfer pulse. By contrast, the signal charges of the odd-numbered columns' light receiving element group are read out to the vertical transfer electrodes 40 in response to the read-out pulse on the phase-two vertical transfer pulse. Signal read-out timing can thus be controlled separately between the even-numbered columns' light receiving element group and the odd-numbered columns' light receiving element group.

The vertical transfer paths 36 are also provided in the OB area 31. The vertical transfer electrodes 38 to 41 on the same rows are electrically interconnected across the effective pixel area 30 and the OB area 31. Consequently, in the OB area 31, signal read-out timing can also be controlled separately between the even-numbered columns light receiving element group and the odd-numbered columns light receiving element group (the hatched elements).

The horizontal transfer path 37, which transfers the signal charges coming from the vertical transfer paths 36 in the row direction, includes a horizontal transfer channel and horizontal transfer electrodes (all not shown). As the horizontal transfer electrodes receive a two-phase horizontal transfer pulse from the TG 15, the signal charges of one row are serially transferred to an output section 42. As is clear from the drawing, each row is composed either of odd-numbered or even-numbered columns' light receiving elements. Consequently, the signal charges are transferred to the horizontal transfer path 37 on one row basis, allowing separate transfer of the signal charges between the hatched and unhatched elements.

The output section 42 includes a floating diffusion amp which converts the signal charges from the horizontal transfer path 37 into voltage signals (hereinafter, image signals).

The CCD 12 has an overflow drain (OFD) area (not shown) for releasing (discharging) the accumulated signal charges of the light receiving elements in the effective pixel area 30 and the OB area 31. Upon application of an OFD pulse to OFD electrode terminals (not shown), the accumulated signal charges are released from the light receiving elements to the semiconductor substrate. This OFD pulse is generated on a predetermined timing after the press of a shutter release button of the operating section 13. The OFD pulse controls the timing for the light receiving elements to start accumulating the signal charges.

Figures 3A, 3B:
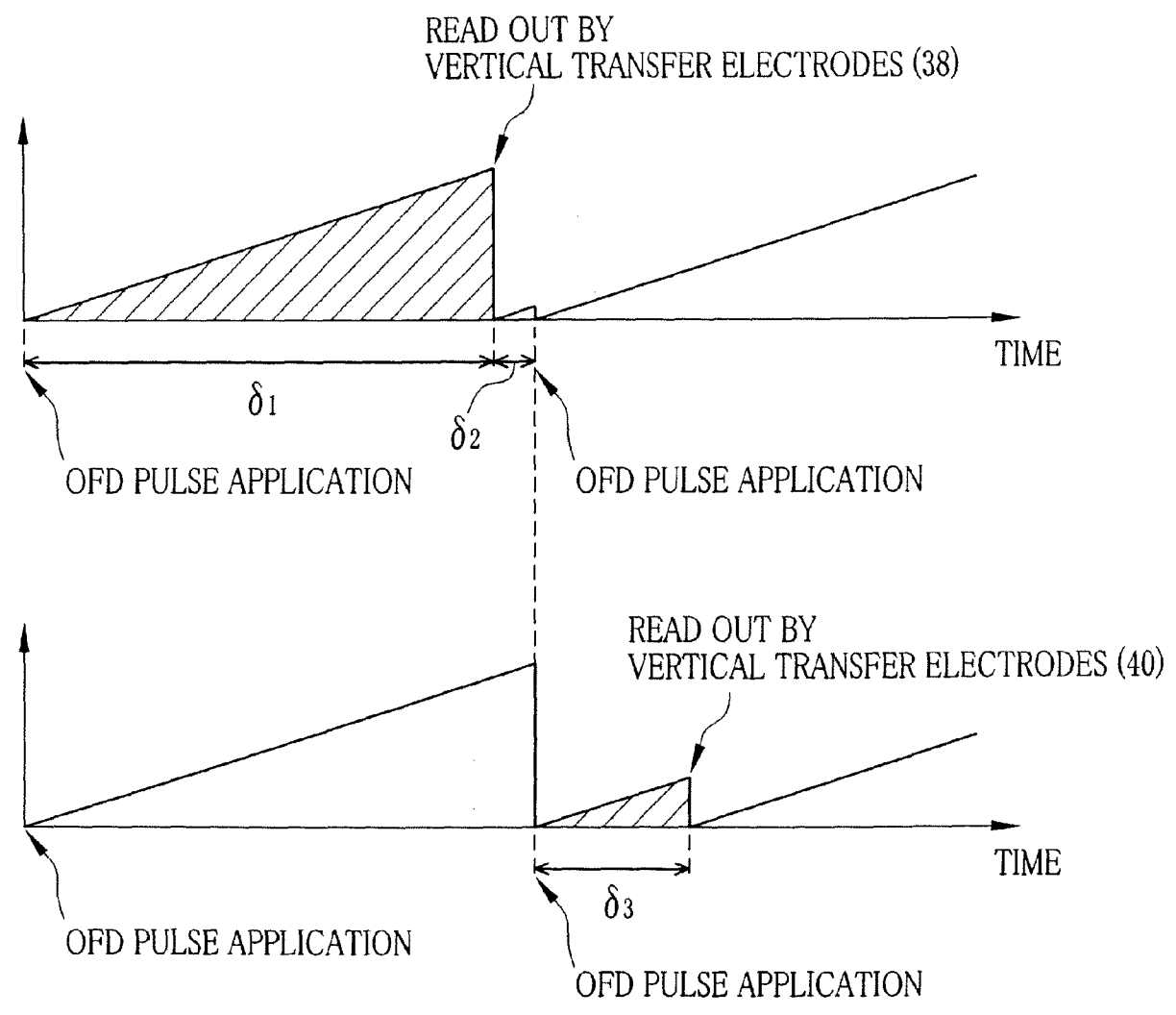

As shown in FIG. 3A and FIG. 3B, the TG 15 drives the CCD 12 on predetermined timings. FIG. 3A relates to the even-numbered columns' light receiving element group, and FIG. 3B relates to the odd-numbered columns' light receiving element group. Firstly, the OFD pulse is generated to drive all the light receiving elements to start releasing the previously-accumulated signal charges and, then, accumulating signal charges. After a lapse of a predetermined time $\delta_1$, the read-out pulse is applied to the vertical transfer electrodes 38 so as to read the signal charges of the even-numbered columns' light receiving elements in the effective pixel area 30 and the OB area 31 out to the corresponding vertical transfer paths 36. After a lapse of a predetermined time $\delta_2$, the OFD pulse is again generated to release the accumulated signal charges from all the light receiving elements. Subsequently, after a lapse of a predetermined time $\delta_3$, the read-out pulse is applied to the vertical transfer electrodes 40 so as to read the signal charges of the odd-numbered columns' light receiving elements in the effective pixel area 30 and the OB area 31 out to the corresponding vertical transfer paths 37. The read-out signal charges are then transferred to the horizontal transfer path 36, and generated as the image signals from the output section 42. The light receiving elements are, as described, arranged in the honeycomb pattern where the elements of the even-numbered columns reside on the even-numbered rows, and the elements of the odd-numbered columns reside on the odd-numbered rows. Accordingly, the signal charges of the even-numbered and odd-numbered columns' light receiving elements can be separately transferred on one row basis in the horizontal direction.

Each of two hatched sectors in the drawing represents the signal charge to be read out to the vertical transfer electrode 38. The light receiving elements on the even-numbered columns are exposed for the time (exposure time or signal charge accumulation time) $\delta_1$, while the light receiving elements on the odd-numbered columns are exposed for the exposure time $\delta_3$. By changing the duration of these exposure times, the sensitivity of the even-numbered and odd-numbered columns' light receiving elements can be separately adjusted. In FIG. 3A and FIG. 3B, the light receiving elements on the even-numbered columns are set to lower sensitivity than those on the odd-numbered columns. The opposite may however be possible.

Figure 4:
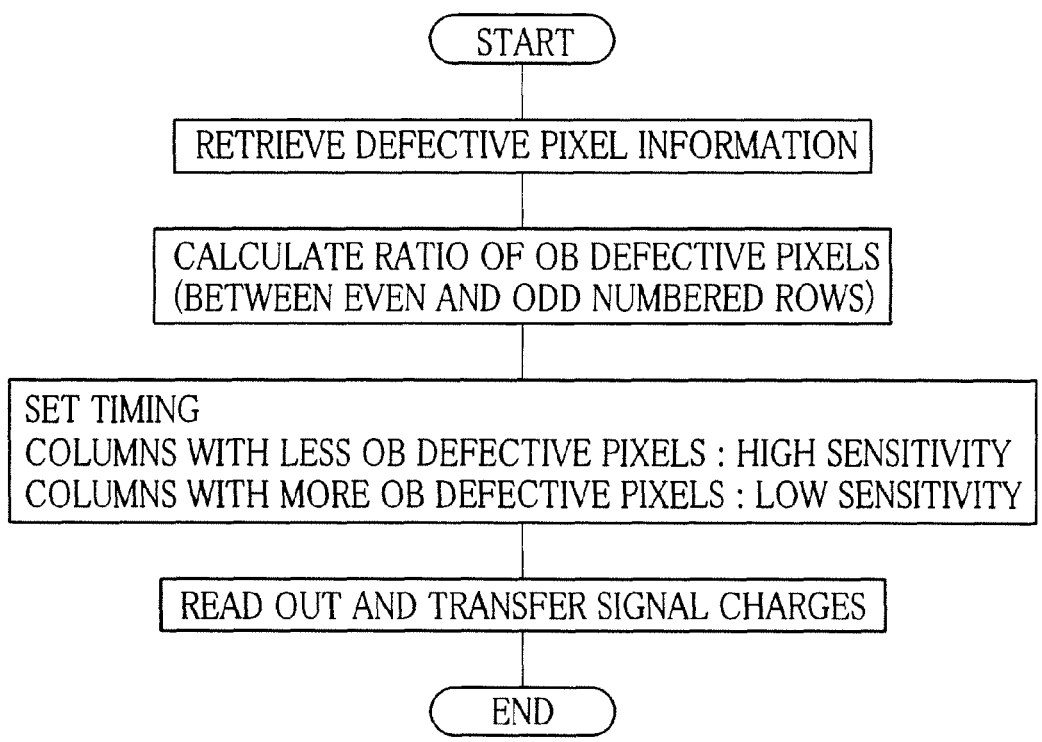
FIG. 4 is a flow diagram of a CCD control procedure.

The CPU 14 controls read-out operation of the CCD 12 based on positional information of the defective pixels in the OB area 31 (i.e., the OB defective pixels). Hereafter, with reference to a flowchart of FIG. 4, the read-out operation control is explained. The CPU 14 retrieves the defective pixel information from the memory 24, and obtains the positional information of the OB defective pixels. Then, the CPU 14 judges as to which of the odd-numbered and even-numbered columns in the OB area 31 have more OB defective pixels. Based on this judgment, the CPU 14 controls the timings of the read-out pulses and the OFD pulses so as to set the columns with more OB defective pixels in low sensitivity, and the columns with less OB defective pixels in high sensitivity. For example, when more OB defective pixels reside on the even-numbered columns, the timings of the read-out pulses and the OFD pulses are controlled as in FIG. 3A and FIG. 3B to set the even-numbered columns' light receiving elements in the effective pixel area 30 and the OB area 31 in low sensitivity.

When the exposure time is decreased to set the odd-numbered columns' elements in low sensitivity while the even-numbered columns' elements are set to high sensitivity, the hatched elements are on a low signal level, and the unhatched elements are on a high signal level. In particular, the light receiving elements 32a, 33a on the first row in the effective pixel area 30 have high sensitivity, and produce high output signals. On the other hand, the light receiving elements 35 on the first row in the OB area 31 are less defective, and though they have high sensitivity, produce low output signals. In the OB clamp processing, the output signals of the light receiving elements 35 are averaged, and this averaged value is subtracted from the output signals of the light receiving elements 32a, 33a on the first row. After the clamp processing, the output signals of the light receiving elements 32a, 33a are relatively high.

On the contrary, the light receiving elements 32b, 33b on the second row in the effective pixel area 30 have low sensitivity, and produce low output signals. The light receiving elements 35 on the second row in the OB area 31 have low sensitivity, and though they are more defective, produce low output signals. In the OB clamp processing, the averaged output signals of these two light receiving elements 35 is subtracted from the output signals of the light receiving elements 32b, 33b on the second row. After the clamp processing, the output signals of the light receiving elements 32b, 33b are relatively low.

After the clamp processing by the OB clamping circuit 17, the pixel signals of the first and second rows are transferred to the DSP 19, which adds (combines) the pixel signals of two adjacent light receiving elements of same color. In the present invention, one of the light receiving element groups on the columns with more OB defective pixels is set to low sensitivity, and the other with less OB defective pixels is set to high sensitivity before starting the charge accumulation. The pixel signals are then applied to the clamp processing before the adding processing. It is therefore possible to suppress the blackening of an image due to the OB defective pixels. In the event that all the light receiving elements are set to the same sensitivity, on the contrary, the luminance of an image is excessively lowered because of the OB defective pixels.

Figure 5C:
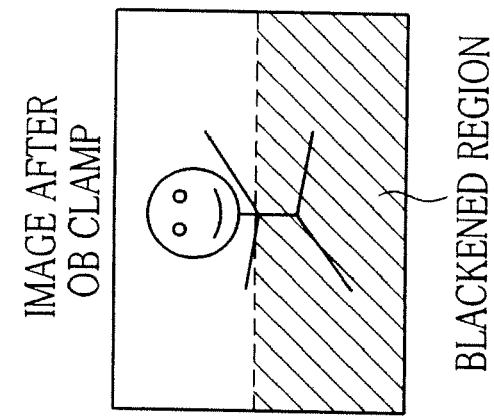
FIG. 5A to FIG. 5C are explanatory views showing image degradation due to a line flow.
Figure 5B:
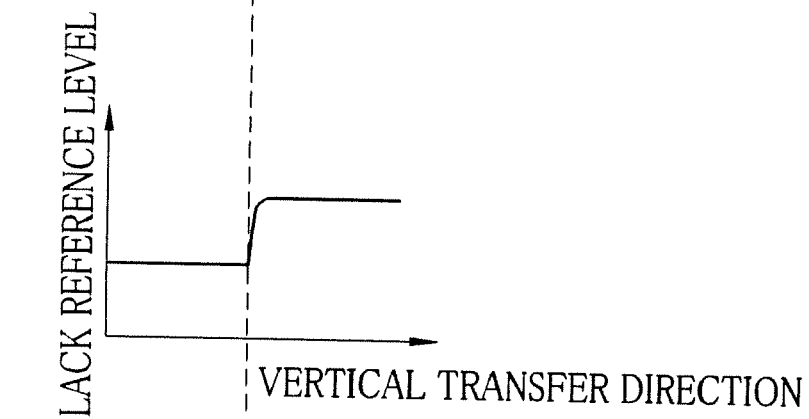
Figure 5A:
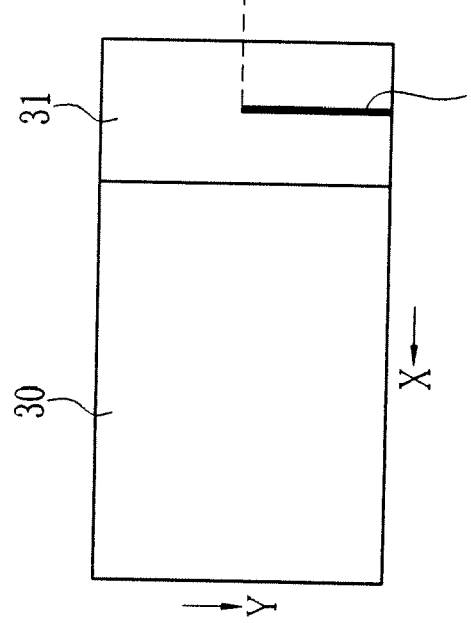

The present invention is particularly effective against the line flaw, or namely the OB defective pixels extending in the column direction. As shown in FIG. 5A, when the OB area 31 has the line flaw extending from the middle of the imaging surface, the conventional OB clamp processing (line clamp processing) is affected by this line flaw, and the black reference level is raised as in FIG. 5B. The resultant image will be blackened in the region that the line flaw crosses, as shown in FIG. 5C. In the present invention, to the contrary, the OB clamp processing is applied separately to the odd-numbered and even-numbered columns' light receiving elements, and the columns with more OB defective pixels are set to low sensitivity before combining the pixel signals. Since the pixels on the same column (either odd-numbered or even-numbered column) as the line flow are all set to low sensitivity, the degradation of image (blackening) is effectively suppressed.

Any conventional interline CCD image sensor can be used as the CCD 12, and the degradation of image due to the OB defective pixels can be suppressed with little additional cost by applying the control method of the present invention.

While the light receiving elements in the above first embodiment are arranged in the honeycomb pattern, they may be arranged in a square lattice pattern.

As shown in FIG. 6, a CCD 50 has effective pixel area 51 and two OB areas 52. The OB areas 52 are located on both sides of the effective pixel area 51, and covered with aluminum light-shielding films 53 that block the object light. For the sake of clarity, only one OB area 52 is shown in the drawing.

In the effective pixel area 51, a plurality of light receiving elements 54a to 56a, 54b to 56b of same size are arranged in a column direction (Y direction) and a row direction (X direction) to form a square lattice array. Above the effective pixel area 51 are formed a plurality of red, green and blue color filters R, G, B.

The light receiving elements 54a, 55a, 56a are placed on every even-numbered column from the downstream side of the row direction. The light receiving elements 54a capture red light, the light receiving elements 55a capture green light, and the light receiving elements 56a capture blue light. By contrast, the light receiving elements 54b, 55b, 56b are placed on every odd-numbered column. The light receiving elements 54b capture red light, the light receiving elements 55b capture green light, and the light receiving elements 56b capture blue light.

Focusing only on the even-numbered columns, the first column having the alternately-arranged light receiving elements 54a, 55a and second columns having the alternately-arranged light receiving elements 55a, 56a are arranged in turns in the row direction. The color filters on the even-numbered columns constitute the Bayer filter mosaic as whole. Similarly, focusing only on the odd-numbered columns, the first columns having the alternately-arranged light receiving elements 54b, 55b and second columns having the alternately-arranged light receiving elements 55b, 56b are arranged in turns in the row direction. The color filters on the odd-numbered columns also constitute the Bayer filter mosaic as whole. In other words, the effective pixel area 51 uses a combination of two Bayer color filter mosaics, or so-called double Bayer arrangement.

Light receiving elements 57 in the OB area 52 are shielded from light by the aluminum light-shielding film 53, and there is no color difference among them. The light receiving elements 57 are of the same size and arrangement as the light receiving elements in the effective pixel area 51.

Each of the light receiving elements in the effective pixel area 51 receives incident light, and convert it into a signal charge proportional to the luminous intensity. As shown by the arrows in the drawing, these signal charges are firstly read out to vertical transfer paths 58 (some of which are denoted) extending in the column direction byway of transfer gates of the light receiving elements, and then transferred in the column direction to a horizontal transfer path 59. Each of the vertical transfer paths 58 includes a plurality of vertical transfer channels (not shown) extending in the column direction in the semiconductor substrate, and a plurality of vertical transfer electrodes 60 to 63 (some of which are denoted) formed on the vertical transfer channels. Electrically interconnected in the row direction, the vertical transfer electrodes 60 to 63 hold the signal charges from the light receiving elements. Upon application of four-phase vertical transfer pulse to the vertical transfer electrodes 60 to 63 from the TG 15, the signal charges are advanced in the column direction on the vertical transfer channels.

Reading of the signal charges from the light receiving elements in the effective pixel area 51 to the vertical transfer paths 58 is controlled by two different read-out pulses: the one superimposed on a phase-two vertical transfer pulse to be applied to the vertical transfer electrode 61 and the other on a phase-three vertical transfer pulse to be applied to the vertical transfer electrode 62. In the effective pixel area 51, more specifically, the signal charges of the even-numbered columns' light receiving element group are read out to the vertical transfer electrodes 61 in response to the read-out pulse on the phase-two vertical transfer pulse. By contrast, the signal charges of the odd-numbered columns' light receiving element group are read out to the vertical transfer electrodes 62 in response to the read-out pulse on the phase-three vertical transfer pulse. Signal read-out timing can thus be controlled separately between the even-numbered columns' light receiving element group and the odd-numbered columns' light receiving element group.

The vertical transfer paths 58 are also provided in the OB area 52. The vertical transfer electrodes 60 to 63 on the same rows are electrically interconnected across the effective pixel area 51 and the OB area 52. Consequently, in the OB area 52, signal read-out timing can also be controlled separately between the even-numbered columns light receiving element group and the odd-numbered columns light receiving element group (the hatched elements).

Each of the vertical transfer paths 58 has one of gate electrodes 64a, 64b which are electrically isolated between the odd-numbered and even-numbered columns. The gate electrodes 64a are terminals of the even-numbered columns' vertical transfer paths 58, and the gate electrodes 64b are terminals of the odd-numbered columns' vertical transfer paths 58. In each horizontal scanning operation, transfer pulses from the TG 15 are applied alternately to the gate electrodes 64*a*, 64*b*. Accordingly, the signal charges in the even-numbered columns' vertical transfer paths 58 and the odd-numbered columns' vertical transfer paths 58 are alternately transferred to a horizontal transfer path 59, which transfers the signal charges of each horizontal scanning operation in the horizontal direction to an output section 65.

The output section 65 is configured in the same manner as the output section 42 of the first embodiment to output the signal charges from the horizontal transfer path 59 in the form of voltage signals. Similar to the first embodiment, the CCD 50 has an overflow drain area for releasing the accumulated signal charges from the light receiving elements in the effective pixel area 51 and the OB area 52.

As with the first embodiment, the CCD 50 can change the exposure time (signal charge accumulation time) or sensitivity of the light receiving elements separately between the odd-numbered and even-numbered columns by controlling the timings of the read-out pulses and the OFD pulses.

A digital camera having this CCD 50 operates in the same way as the digital camera 10 of the first embodiment, controlling the read-out pulses and the OFD pulses in such a manner that the pixel columns having more OB defective pixels are set to low sensitivity, and the pixel columns having less OB defective pixels are set to high sensitivity. This digital camera can, as a result, also suppress the degradation of image due to the OB defective pixels.

While the above embodiments are directed to the CCD image sensors, the present invention is also applicable to MOS type image sensors insofar as the exposure time can be changed separately between the odd-numbered columns' light receiving elements and the even-numbered columns' light receiving elements.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging apparatus comprising:
   a solid-state imaging device having a plurality of light receiving elements arranged into a two dimensional array on an imaging surface composed of an effective pixel area and optical black areas, said light receiving elements belonging to one of first and second element groups whose exposure times can be controlled separately, each of said first and second element groups being settable to high or low sensitivity;
   a memory for storing defective pixel information of said optical black areas;
   a drive controller for driving said solid-state imaging device, said drive controller referring to said defective pixel information and setting one of said first and second element groups having more defective pixels in said optical black areas to low sensitivity while setting the other of said element groups having less defective pixels in said optical black areas to high sensitivity;
   a clamping device for firstly acquiring an average value of output signals from said optical black areas and subsequently correcting each output signal from said effective pixel area with said average value, said clamping device performing said average value acquisition and said output signal correction to each of said first and second element groups; and
   an image processor for generating image data after combining said corrected output signals of said first and second element groups in each pixel.

2. The imaging apparatus of claim 1, wherein said light receiving elements are arranged along row and column directions of said imaging surface, and said light receiving elements of said first and second element groups are alternated in said row direction, and
   wherein said clamping device performs said average value acquisition and said output signal correction row-by-row to each of said first and second element groups.

3. The imaging apparatus of claim 2, further comprising red, blue and green color filters placed above said effective pixel area, said color filters constituting a Bayer array for each of said first and second element groups.

4. The imaging apparatus of claim 2, wherein said light receiving elements are arranged in a honeycomb pattern.

5. The imaging apparatus of claim 2, wherein said light receiving elements are arranged in a square lattice pattern.

6. The imaging apparatus of claim 1, wherein said solid-state imaging device comprises a CCD image sensor.

7. The imaging apparatus of claim 1, wherein said defective pixel information is positional information of defective pixels in said optical black areas, and
   wherein said drive controller identifies said defective pixels based on said positions, and finds the number of said defective pixels in said optical black areas for each of said first and second element groups.

* * * * *